United States Patent
Berry et al.

(10) Patent No.: US 6,962,350 B2
(45) Date of Patent: Nov. 8, 2005

(54) INSERTABLE WEAR STRIP FOR GLASS RUN SEALS

(75) Inventors: David Harold Berry, Northville, MI (US); John David Mullett, Ottawa, OH (US); Don Kelvin Wallace, Riverview, MI (US)

(73) Assignee: Cooper-Standard Automotive Inc., Findlay, OH (US)

( * ) Notice: Subject to any disclaimer, the term of this patent is extended or adjusted under 35 U.S.C. 154(b) by 24 days.

(21) Appl. No.: 10/640,090

(22) Filed: Aug. 13, 2003

(65) Prior Publication Data

US 2004/0104541 A1 Jun. 3, 2004

Related U.S. Application Data

(60) Provisional application No. 60/403,155, filed on Aug. 13, 2002.

(51) Int. Cl.[7] .................................. F16J 15/46
(52) U.S. Cl. .................. 277/628; 277/640; 277/641; 277/906
(58) Field of Search ................ 277/628, 637, 277/640, 641, 644, 647, 906

(56) References Cited

U.S. PATENT DOCUMENTS 4,001,974 A * 1/1977 Wright ................ 49/489.1
4,119,325 A * 10/1978 Oakley et al. .......... 277/642
4,790,590 A 12/1988 Ito et al.
4,864,774 A 9/1989 Onishi et al.
4,923,759 A 5/1990 Brooks et al.
5,345,718 A 9/1994 Dupuy
5,461,830 A 10/1995 Dupuy
5,744,211 A 4/1998 Nakata et al.
5,746,471 A 5/1998 Teramoto et al.
2001/0001916 A1 5/2001 Nozaki
2003/0209864 A1 * 11/2003 Dron ..................... 277/628

FOREIGN PATENT DOCUMENTS

JP 3-42331 2/1991
JP 5-254345 10/1993

* cited by examiner

Primary Examiner—Enoch Peavey
(74) Attorney, Agent, or Firm—Fay, Sharpe, Fagan, Minnich & McKee, LLP

(57) ABSTRACT

An insertable wear strip assembly is dimensioned for insertion into an associated cavity of an associated weatherseal. The wear strip assembly includes a generally U-shaped base portion having a base wall, and first and second sidewalls extending from the base wall for receiving the window glass. First and second compliant thin wall regions extend outwardly from the first and second sidewalls, respectively, for low friction, sliding engagement with the window glass. Optionally, the insertable wear strip is secured to the weatherseal via fasteners.

20 Claims, 3 Drawing Sheets

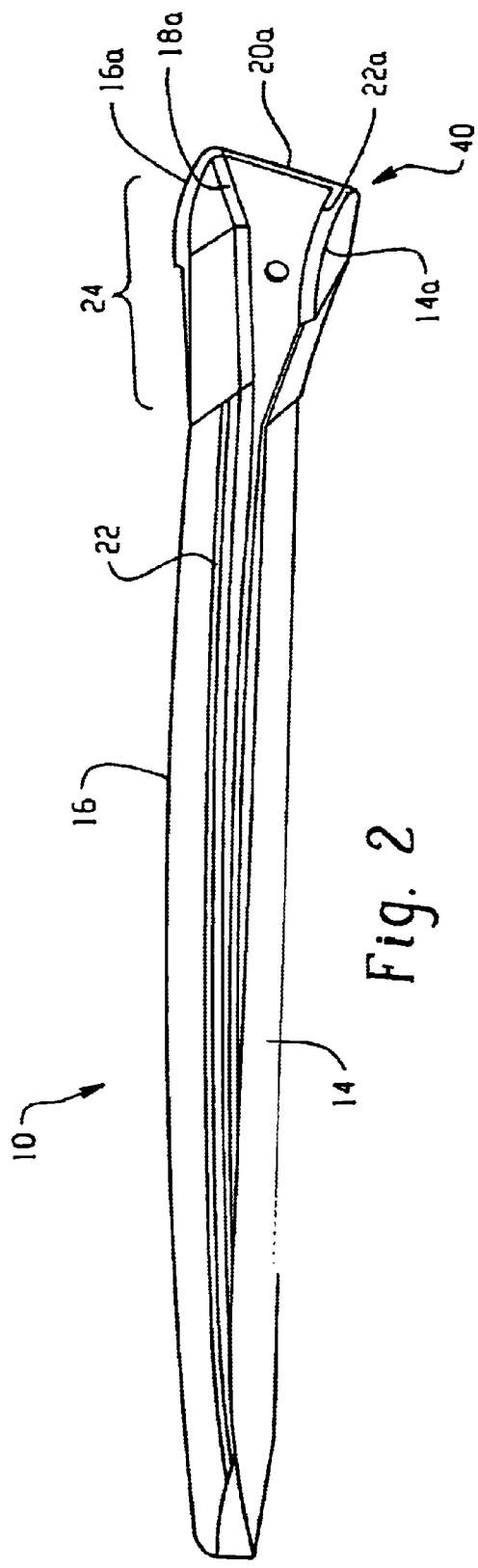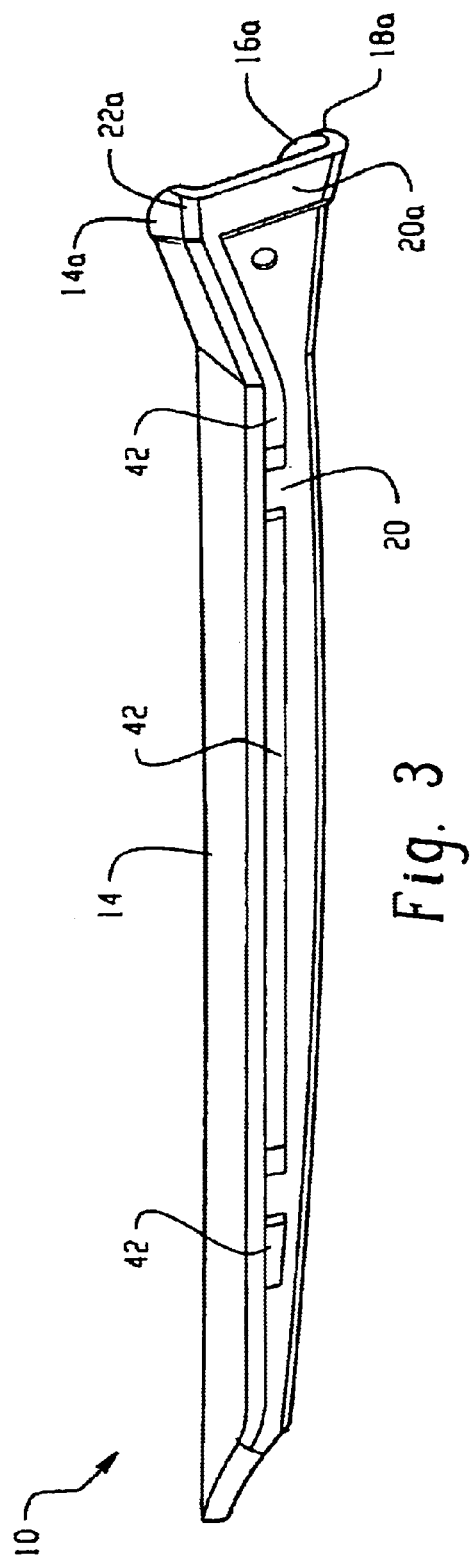

INSERTABLE WEAR STRIP FOR GLASS RUN SEALS

This application claims priority from U.S. provisional application Ser. No. 60/403,155, filed Aug. 13, 2002.

BACKGROUND OF THE INVENTION

The present invention is glass run seals and more particularly to an improved wear resistance of sliding glass, and eliminating the need to coat the glass contact area of the rubber/elastomer in automotive weather seals.

In particular, a mirror sail seal, located on an automotive vehicle, has a small amount of glass contact area with high seal force which results in rapid wear when the glass slides up and down. This glass contact area is of such a geometrical shape that there is great difficulty in being able to access the glass contact area for the purpose of applying a proper low friction coating. Also, the operation to apply the coating is by hand application only and this makes the low friction coating application have great variations in primer application and coating thickness, and also is very expensive. Therefore, premature failure of the coating is common, and quality problems result with the OEM and the manufacturer.

U.S. Pat. Nos. 5,345,718, and 5,461,830 disclose below-belt glass runs or guide members of a molded plastic construction that eliminate the need for a separate underlying support member. The guide members have a low friction, non-abrasive surface for engaging interior and exterior surfaces of the automotive window.

It is also known to use a plastic wear-strip that is placed in the base of an extruded seal for the purpose of edge of glass wear that are referred to in the industry as poly-wear strips. The poly-wear strips are applied to an extrusion as opposed to the insert being applied on a molded piece. Also, and even more significant, the necessity for coating low-friction slip-coating or flock-coating on the sealing lips of the prior art poly-wear strip is still required. Thus, the ability to eliminate the requirement for, and processing steps associated with, applying a low-friction slip coating or flock coating to an insertable wear strip, particularly on a molded component, would be an improvement over the prior art.

Thus, a need for an improved solution exists and this invention relates to solving these problems and others in a simple, economical manner.

SUMMARY OF THE INVENTION

This invention provides an improved low friction insert that can be placed inside the glass weatherseal.

In a preferred embodiment, the insert has a thin wall region or fin-type wear surfaces which fit between the elastomeric weatherseal and the glass. The insert is optionally held in position by mechanical means.

Preferably, the insert has a thicker-wall area, which provides a wear strip for the more abrasive edge-of-glass contact area, and the thin wall region is molded in a straight line with a supporting u-channel of the weatherseal and bent easily to allow the elastomeric seal to press-fit the thin-fin and thus seal tightly to the glass surface. These thin-wall areas mostly contact the sides of the glass and to a lesser degree the edge of the glass.

A preferred arrangement of the insert includes a funnel-type feature which is disposed below the belt-line area of the door and acts as a guide to intercept the glass, as it moves upwardly from a lowermost position, and guides the edge of the glass into the mirror sail and between the thin-fins of the insert.

Still other benefits and advantages of the invention will become apparent to those skilled in the art upon reading and understanding the following detailed description.

BRIEF DESCRIPTION OF THE DRAWINGS

FIGS. 2 and 3 are front and rear perspective views of the insert of the present invention.

DETAILED DESCRIPTION OF THE INVENTION

Figure 1:
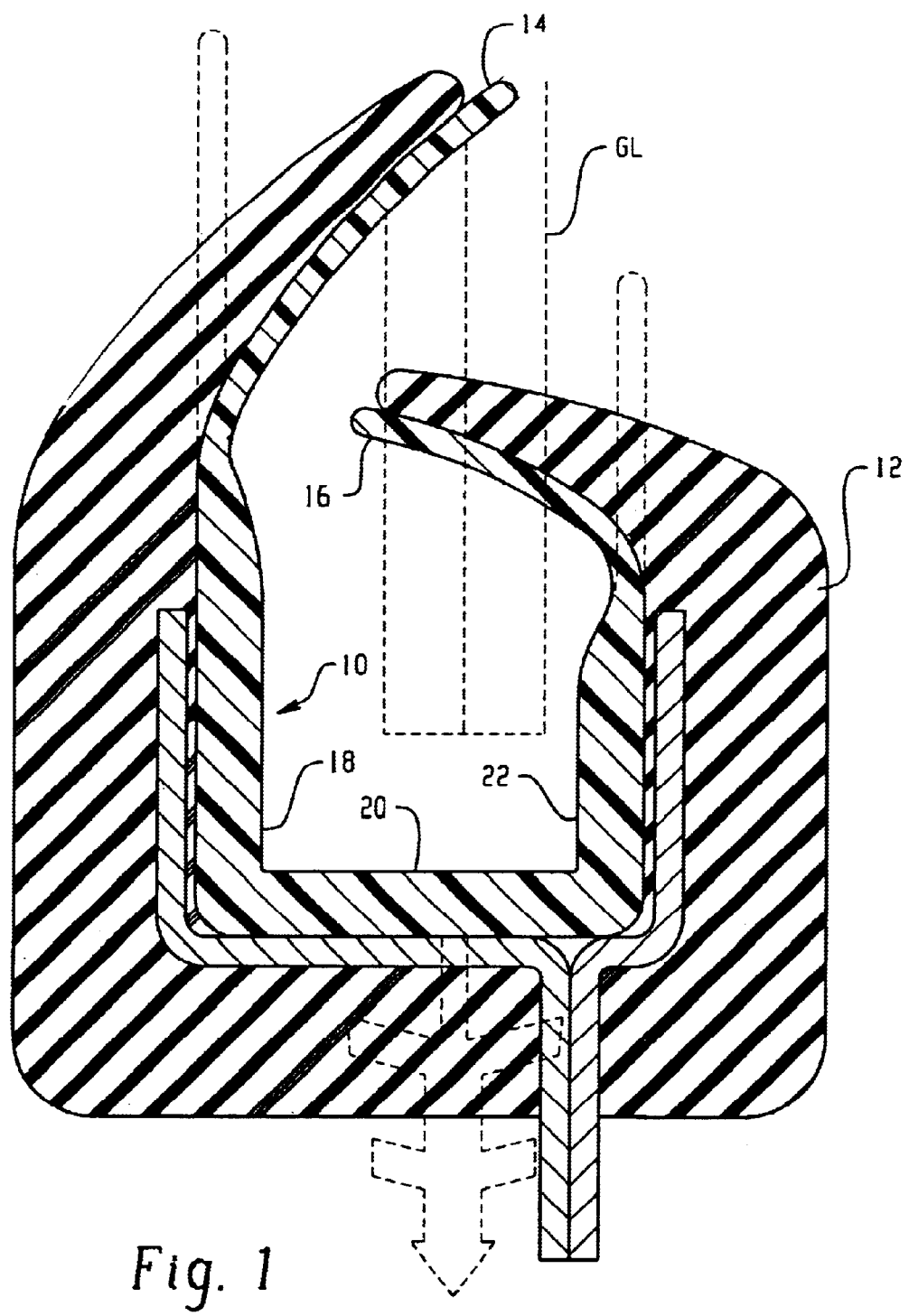
FIG. 1 is a cross-sectional view of the present invention received in a mirror sail.
Figure 4:
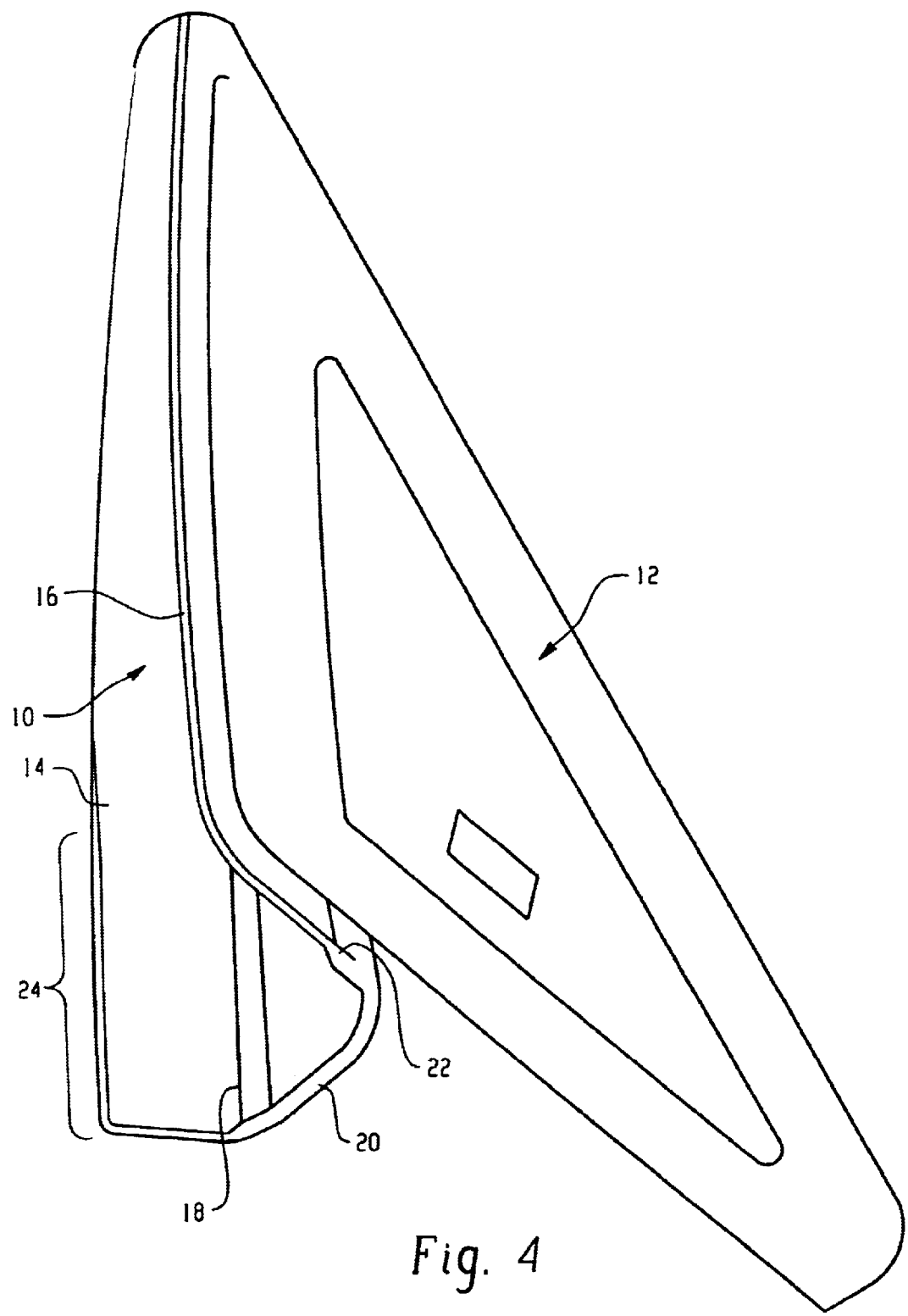
FIG. 4 is a perspective view of the insert mounted into a groove of the mirror sail.

With initial reference to FIG. 1, the invention includes a mechanically-fitted molded-plastic insert 10 that is received into a molded elastomeric or rubber mirror sail 12. The invention allows the slip or low friction coating or flock coating that is typically used on the sealing member to be replaced by the insert, particularly by thin wall regions or thin-fins thereof.

The present invention eliminates a glass run extrusion in the sail and it also provides the sliding surface for the glass not only below the beltline area but also above the beltline area. The insert 10 provides a glass contact surface that is sufficient to provide a sliding surface for the smooth side of glass, and also withstands the wear associated with the abrasive ground-edge of glass.

More particularly, the present invention provides a separately molded plastic 10 (see FIGS. 2 and 3) which is manually placed and can have the option of being mechanically retained by one or more fasteners F within a molded elastomer piece 12, shown in FIG. 3 as a molded rubber mirror sail. However, the molded plastic insert component is preferably not bonded to the glass weatherseal in which it is received. The nature of the thin-wall wear surfaces of the insert is to provide a low friction wear strip that contacts the smooth surfaces of the glass, and also provides a durable wear surface for the glass edge along the base of the glass run. The invention relates to creating an insertable plastic part which fits into a rubber glass seal on a door of an automotive vehicle. The plastic insert has unique areas designed into it which provides any or all of at least three functions:

- a compliant wear-surface that fits between the sides of the movable-glass GL and its elastomeric sealing member. This compliant wear surface is the thin-wall areas 14, 16 of the insert;
- a rigid wear-surface 18, 20, 22 that fits between the edge of the movable glass and the mirror-sail or other glass seal; and
- a "funnel-area" 24 which intercepts and guides the glass into the proper location within the weatherseal or mirror sail when the glass is moved upward.

By using this invention the following advantages can be obtained. The seal with the insert is less expensive to manufacture than the prior art versions which have a coating that is applied to the sealing lips. The reduction in cost to manufacture is due to the elimination of primer operations, coating operations, curing-the-coating operations, and insertion of a flocked rubber insert in the mirror sail. Also, the geometric nature of mirror sail seals makes coating the surface very difficult—many times, special fixtures are needed to do the coating. Moreover, the geometric angle in which the seal contacts the glass puts tremendous wear loads on the coating, thus the need exists for the present invention to solve these problems.

The seal insert has improved wear surfaces, which eliminates "squeaking", and rubber transfer onto glass, and increased lifting-the-window loads which exist currently because the coating wears out prematurely. The increased lifting loads can result in premature electric window motor failure. Coatings, primers, and other hazardous materials can be also eliminated from the production process.

The insert can be made of many types of plastics that have low coefficient of friction values. By way of example, coefficient of friction values ranging from approximately 0.1 to 0.5 may be used, with the preferred range being approximately 0.15. Since the insert is placed into an existing rubber molding and is retained via mechanical means, bonding to the rubber is not necessary.

Another important characteristic is the thickness of the thin wall regions or areas 14, 16. By way of example, a preferred range of thickness of the thin wall areas is approximately between 0.003 to 0.030" thick, with a range around 0.012" being preferred in order that the thin wall area is compliant so the rubber seal can bend the plastic tightly onto the sides of the glass in order to make a tight seal. The remaining portions of the insert have thicker walls 18, 20, 22 in order to have these areas rigid enough to (a) be hand pushed into the rubber molding and (b) provide edge of glass wear properties and (c) to provide stiffness in the funnel area 24 which intercepts the glass and guides or funnels the glass into the mirror sail—these areas are preferably on the order of from approximately 0.015" to 0.160" in thickness, with approximately 0.06" being the preferred thickness.

The overall geometric shape is such as to fit inside a weatherseal such as the illustrated mirror-sail. Each car model has different body curves and shapes which necessitate the mirror sail to be a different shape which also requires the insert to vary in overall length, width, and curvature.

The main features are the two distinct areas of wall thickness—a thicker area 18, 20 for the structural integrity and a thin-wall area "fins" 14, 16 which provide compliant wear surfaces. This compliant nature allows for ease of molding in one position, and later bending and becoming compliant with the position of the sealing lips of the rubber part which these fins are placed or inserted into. The thin-wall areas which match the length of the sealing lips (only slightly longer so as not to allow the rubber to come into contact with the glass) eliminates the need to provide coating operations which is the current method to provide wear surfaces to the rubber seal. The insertable plastic wear strip 10 also eliminates the need for a low-friction wear surface in the base of the channel area which comes into contact with the edge of the movable glass and flocking or inserting a flocked part can be eliminated.

The insert may be manufacture from a wide range of materials. These materials include thermoplastics, thermosetting plastic, low friction rubbers, and composite materials such as carbon graphite, cross-linking polymers, etc. It will be appreciated that various materials can be used that achieve the low friction sealing, and durable wear surface where the insert engages the edge of the glass, without departing from the scope and intent of the present invention.

As illustrated in FIG. 1, the insert 10 has a generally U-shaped cross-section comprising a base wall 20 that interconnects the sidewalls 18, 22. These regions of the insert have a substantially thicker cross-section than the compliant thin-wall regions or fins 14, 16. Thus, it is preferred that the insert be molded to have a generally U-shaped configuration, i.e., the thin fins 14, 16 extend generally linearly outward from the sidewalls 18, 22, respectively. Once inserted into the rubber weatherseal 12, the lips 30, 32 of the weatherseal urge the thin-wall sealing fins of the insert into a compliant or folded position. Thus, the folded position provides an elastic biasing force exerted on the thin fins that sealingly engage the inner and outer surfaces of the window glass as the glass proceeds through the combined weatherseal and insert as it is raised and lowered. The thin fins of the insert are of sufficient length to assure that the fins provide the sealing engagement with the glass surface, rather than the rubber. The low friction of the insert still achieves the desired sealing function but avoids the attendant problems associated with conventional elastomeric/rubber weatherseals in these regions, i.e., the squealing, lifting loads coating issues identified above.

FIGS. 2 and 3 illustrate in greater detail the funnel region 24 of the insert that facilitates in guiding and alignment of the window glass through the combined insert/weatherseal. The funnel still has a generally U-shaped cross-section that transitions to a wider inlet since the base wall 20 has a wider dimension in this region. It may also be desirable to further increase the thickness of the sidewalls 18a, 22a, and particularly the thin wall fins 14a, 16a in this funnel region, particularly where the sidewalls decrease in height or taper downwardly as they terminate at the inlet 40, since the window glass will initially engage the funnel when the window glass is raised. The opposite end of the insert tapers or blends to conform to the mirror sail configuration in this embodiment.

Strengthening ribs 42 are shown as extending longitudinally along an outer surface of the base wall 20. These ribs can be continuous or discontinuous depending on the anticipated strength requirements of the insert.

The invention has been described with reference to the preferred embodiment. Additional modifications and alterations will become apparent to those skilled in the art upon reading and understanding this specification. It is intended that the invention be construed to cover all such modifications and alterations insofar as they come within the scope of the appended claims or the equivalents thereof.

Having thus described the invention, it is now claimed:

1. An insertable wear strip assembly dimensioned for insertion into an associated cavity of an associated weatherseal, the wear strip assembly comprising:

a generally U-shaped base portion having a base wall, and first and second sidewalls extending from the base wall in spaced relation and at a dimension approximating an associated width dimension of an associated window glass;

first and second compliant thin wall regions extending outwardly from the first and second sidewalls, respectively; and an inlet region having a funnel shape where the thin wall regions and sidewalls are spaced apart a first, greater dimension that transitions to a second, smaller dimension that remains substantially continuous over a remainder of the longitudinal extent of the insertable wear strip assembly.

2. The insertable wear strip assembly of claim 1 further comprising fasteners dimensioned for operative receipt through the base portion and adapted to secure the wear strip in the associated cavity.

3. The insertable wear strip assembly of claim 1 wherein the base wall is approximately five times as thick as the compliant thin wall regions.

4. The insertable wear strip assembly of claim 1 wherein the thin wall regions extend outwardly from terminal ends of the sidewalls spaced from the base wall.

5. The insertable wear strip assembly of claim 4 wherein a thickness of the sidewalls smoothly transitions into a reduced thickness of the thin wall regions.

6. The insertable wear strip assembly of claim 5 wherein the thin wall regions easily fold along the transitions to allow the insertable wear strip assembly to substantially close a cavity defined between the sidewalls and the base wall.

7. The insertable wear strip assembly of claim 1 wherein the thin wall regions are molded in parallel relation.

8. The insertable wear strip assembly of claim 1 wherein the insertable wear strip has a longitudinal extent and the inlet region is disposed adjacent a beltline of the associated weather seal.

9. The insertable wear strip assembly of claim 8 wherein the inlet region defines a minor portion of the longitudinal extent of the insertable wear strip.

10. The insertable wear strip assembly of claim 1 wherein the wear strip assembly has a low coefficient of friction value ranging from approximately 0.1 to 0.5.

11. The insertable wear strip assembly of claim 1 wherein the base wall and sidewalls of the base portion having thicknesses ranging from approximately 0.015" to 0.160".

12. The insertable wear strip assembly of claim 1 wherein the base wall and sidewalls of the base portion having thicknesses of approximately 0.06".

13. The insertable wear strip assembly of claim 1 wherein the thin wall regions have a thickness ranging from approximately 0.003" to 0.030".

14. The insertable wear strip assembly of claim 1 wherein the thin wall region has a thickness of approximately 0.012".

15. In combination, a weatherseal and low friction insert comprising:

the weatherseal having a base wall interconnecting first and second sidewalls and all formed of an elastomeric material and forming a receiving cavity dimensioned to receive a window glass of an automotive vehicle therein; and the low friction insert operatively received in the cavity of the weatherseal, the insert having a base portion including first and second sidewalls disposed in spaced relation, the insert base portion and sidewalls dimensioned to respectively conform with the base wall and sidewalls of the weatherseal, outer terminal ends of the first and second insert sidewalls forming thin wall regions of substantially reduced thickness than a remainder of the insert sidewalls, the thin wall regions having a thickness ranging from approximately 0.003" to 0.030".

16. The invention of claim 15 further comprising a fastener for mechanically securing the insert to the weatherseal.

17. The invention of claim 15 wherein the weatherseal is a molded component.

18. The invention of claim 15 wherein the insert further includes a funnel-shaped inlet in which the insert sidewalls are spaced apart a first, greater dimension at a location below a beltline and transition into a second, reduced spacing within the molded weatherseal.

19. The invention of claim 15 wherein the insert sidewalls are approximately five times the thickness of the thin wall regions.

20. The invention of claim 15 wherein the sidewalls of the weatherseal are bent inwardly toward one another and engage the insert sidewalls to press them against the associated glass.

* * * * *